Sept. 3, 1946.   F. J. TIPPEN   2,407,042
GOVERNING GEAR FOR ENGINES AND OTHER MACHINES
Filed Nov. 7, 1942   3 Sheets-Sheet 1
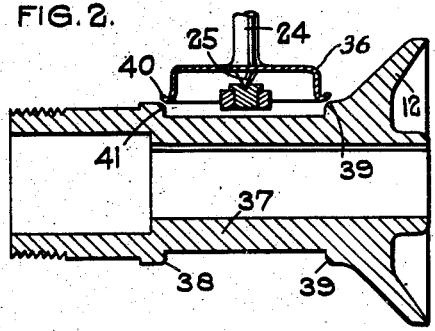
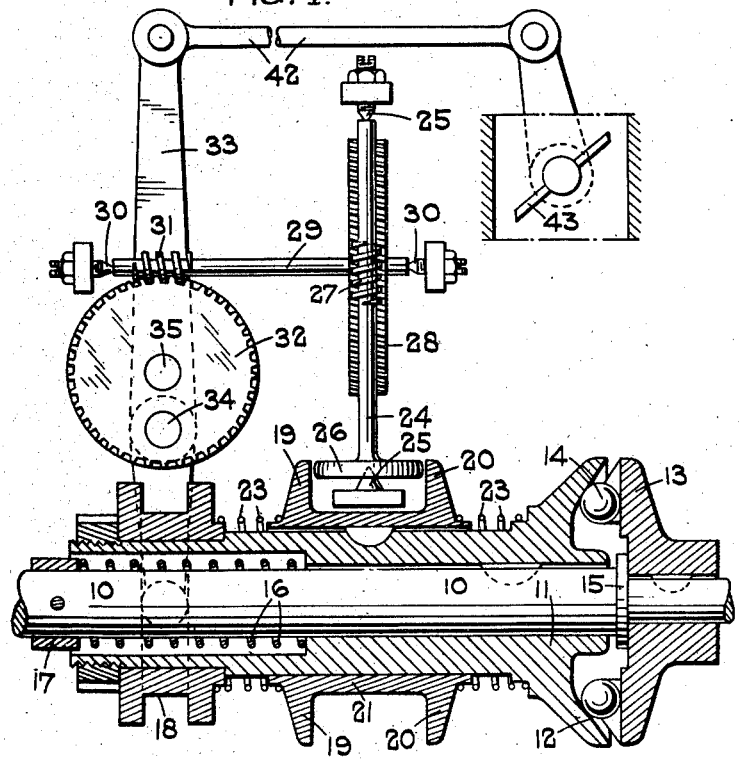
INVENTOR
Frank John Tippen
By Henry J. Lucke
HIS ATTORNEY.

Sept. 3, 1946.   F. J. TIPPEN   2,407,042
GOVERNING GEAR FOR ENGINES AND OTHER MACHINES
Filed Nov. 7, 1942    3 Sheets-Sheet 2

INVENTOR
Frank John Tippen.
BY Henry J. Lucke
HIS ATTORNEY.

Sept. 3, 1946.  F. J. TIPPEN  2,407,042
GOVERNING GEAR FOR ENGINES AND OTHER MACHINES
Filed Nov. 7, 1942  3 Sheets-Sheet 3

INVENTOR
Frank John Tippen.
BY Henry J. Lucke
HIS ATTORNEY.

UNITED STATES PATENT OFFICE 2,407,042

GOVERNING GEAR FOR ENGINES AND OTHER MACHINES

Frank John Tippen, Coventry, England, assignor to Leonard Pelham Lee, near Stratford-on-Avon, England Application November 7, 1942, Serial No. 464,899
In Great Britain December 23, 1941

13 Claims. (Cl. 264—3)

When the sleeve of a centrifugal governor is connected to the regulating member of an engine or machine by mechanism having no means of adjusting during working, the regulating member will occupy a definite position for each position of the balls of the governor. The position of the balls of the governor is dependent on the speed of the engine or machine. When a change of speed occurs, in order to return the speed to the initial constant, a new position of the regulator is required in relation to the position of the balls. In other words, the position of the balls at any given speed is the same whatever the load on the engine may be, but various positions of the regulating member are required at various loads to keep the speed constant. Thus if the speed is to be returned to the initial constant speed after a change of load and kept there, the mechanism connecting the governor sleeve to the regulating member must be capable of adjustment or correction during working, and some means must be provided for adjusting or correcting it.

Further, when a change of speed occurs, if the mechanism connecting the governor sleeve to the regulator is not capable of adjustment during working, then the governor operates to bring the speed back to a constant level, which, however, is not the initial constant speed.

The present invention relates to governing gear of the type which includes correcting mechanism adapted to eliminate or modify the aforesaid speed variation, such mechanism operating in response to any displacement of the governor sleeve consequent upon a change in its rotational speed and being arranged to operate upon actuating mechanism operating between the governor sleeve and the regulating means of the engine or machine and to cause this actuating mechanism to impart to the regulating means a movement in the same direction as, but additional to, the movement imparted thereto as a result of the direct connection between the actuating mechanism and the governor sleeve when the latter is moving away from the position corresponding with normal speed (hereinafter called the normal position).

The correcting mechanism may come into operation when the governor sleeve moves in either direction from the normal position and may continue to operate in the same direction until the governor sleeve has returned to said position when it may automatically cease to operate. The adjustment of the actuating mechanism effected during the period during which the governor sleeve has moved away from and back to the normal position, however, remains unaltered until the governor sleeve moves to the opposite side of the normal position. Thus during the period while the governor sleeve is moving away from the normal position, the operative end of the actuating mechanism is receiving movement in the same direction both from the direct connection of the actuating mechanism with the governor sleeve and from the correcting mechanism. As the governor sleeve moves back to its normal position, however, the direct connection tends to move the actuating mechanism in the reverse direction, but the correcting mechanism may continue to move or adjust it in the original direction.

The actuating mechanism which operates between the governor sleeve and the regulating means of the engine or machine includes a member upon which the correcting mechanism acts.

The present invention relates to governing mechanism of the kind above described, and wherein the driving means for the correcting mechanism includes a pair of circumferential shoulders operated by the governor sleeve adapted to engage the periphery of a friction pulley on a primary transmission shaft arranged transversely to the governor sleeve, the two shoulders being adapted to engage the said periphery at diametrically opposite points, the arrangement being such that displacement of the governor sleeve from the normal position axially in one direction causes one of the shoulders to engage the friction pulley and to drive the primary transmission shaft in one direction, and displacement of the governor sleeve axially from the normal position in the opposite direction brings the other shoulder into engagement with the friction pulley and thus drives the primary transmission shaft in the opposite direction.

The actuating mechanism is connected by any suitable means to the regulating member of the engine or machine which may take the form of a throttle valve or an injection pump or other member.

One of the objects of the present invention is to provide a construction wherein the governor sleeve is free to move axially for any required distance without imposing any undue stress upon the shoulders or flanges which engage the friction pulley or on the pulley itself or on its shaft or on the bearings of the shaft.

This object is achieved by mounting or constructing one of the two driving members for the correcting mechanism, i. e., the shoulders or flanges and the friction pulley, resiliently, so that after driving contact has been established, the governor sleeve can continue to move axially without causing any damage.

The shoulders or flanges which form one of the driving members may be provided on a driving sleeve, in driving engagement with the governor sleeve, through which the governor sleeve can slide, and the governor sleeve may be provided with shoulders, between which and the ends of the driving sleeve, light springs are provided.

Alternatively, the friction pulley may be made of thin spring material of cup-like form, the open side being directed towards the governor sleeve, and the driving shoulders or flanges may be provided on the governor sleeve, and their peripheries may act upon the edge of the friction pulley at opposite points.

In another arrangement the friction pulley may be mounted so that it can move bodily substantially parallel to the axis of the governor sleeve and against spring pressure.

For instance, the friction pulley may be mounted on a shaft carried by a lever pivoted on an axis at right angles to the axis of the governor sleeve, spring means being provided for opposing displacement of the lever from the neutral position in which the friction pulley is not driven.

A further object of the present invention is to provide an arrangement wherein the speed is brought back to the constant as quickly as possible, but in which successive and diminishing speed fluctuations on each side of the constant are prevented or greatly reduced, so that the governor is substantially deadbeat.

This object is achieved by providing two separate governors, one for the actuating means and one for the correcting means, and driving the correcting means by a friction pulley mounted for bodily movement substantially parallel to the axis of the governor sleeve, and applying to the mounting of the friction pulley spring centralising means opposing displacement away from the neutral position, and damping means acting in conjunction with the centralising means and resisting movements thereof both away from and towards the neutral position.

The provision of two separate governors, one for the actuating means and one for the correcting means, enables the centralising and damping means to be applied to the correcting means without also applying them to the actuating means, where they would produce undesirable results.

Referring to the drawings:

Figure 1 is a sectional view in side elevation showing one construction in accordance with this invention.

Figure 2 is a sectional view showing another construction.

Figure 3:
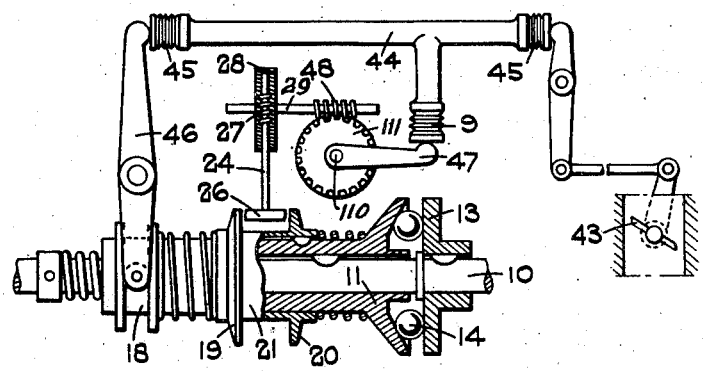
Figure 3 is a view in side elevation showing a modified form of actuating mechanism.

In the construction shown in Figure 1, mounted on the governor shaft 10 so as to rotate with it, is the governor sleeve 11 which is provided with a cup 12 of conical or similar form at one end. The governor shaft 10 is also provided with a disc 13 which faces the cup and which is constructed with a plurality of pockets in which balls 14 are located, these balls forming the centrifugal members of the governor. Both the disc 13 and the governor sleeve 11 are driven by the governor shaft 10, and a shoulder 15 is provided whereby the disc is prevented from axial movements. Thus when, due to centrifugal force arising from the speed of rotation, the balls move outwardly, they displace the governor sleeve 11 axially along the shaft by an amount which is proportional to the speed.

Any other form of centrifugal governor may be used.

At the end which is opposite to that where the cup 12 is situated, the governor sleeve 11 is loaded in an endwise direction by means of a helical spring 16 which finds an abutment against a collar 17 pinned to the governor shaft.

The governor sleeve 11 intermediate the cup 12 and a muff 18 thereon is provided with a pair of external flanges 19, 20. These flanges are formed upon a flange sleeve 21 slidably mounted on the governor sleeve.

The sleeve 21 is acted upon by light springs 23, these springs keeping the sleeve in a definite neutral position at the desired constant engine speed.

A primary transmission shaft 24 is mounted in suitable thrust bearings 25, and the axis of this shaft is at right angles to the axis of the governor sleeve.

Mounted on this shaft 24 and disposed between the two flanges 19 and 20 is a friction pulley 26, the periphery of which is normally just clear of the flanges. Any axial displacement of the governor sleeve 11, however, in either direction from the position it occupies at the desired constant speed increases the pressure of one spring 23 and decreases the pressure of the other, and consequently brings one of the flanges 19, 20 into contact with the friction pulley and drives the primary transmission shaft. As the two flanges engage the friction pulley at diametrically opposite points, the primary transmission shaft 24 will be driven in one direction when driven by one flange, and in the other direction when driven by the other flange.

The primary transmission shaft 24 operates reduction gearing and this may take any suitable form. For instance, the reduction gearing may incorporate simple or compound worm gearing through which the over-riding adjustment is imparted to the actuating mechanism.

In the arrangement shown in Figure 1, the primary transmission shaft 24 carries a worm 27 which engages a worm wheel 28 upon a secondary transmission shaft 29 mounted in suitable thrust bearings 30 and arranged parallel to the governor shaft. This secondary transmission shaft 29 is provided with a worm 31 which drives a worm wheel 32, and the actuating mechanism includes a lever 33, the fulcrum 34 of which is mounted eccentrically in the said worm wheel, so that when the worm wheel 32 is turned on its pin 35, the position of the fulcrum 34 is bodily adjusted substantially parallel with the axis of the governor sleeve.

With this arrangement, any displacement of the governor sleeve 11 in either direction from the position it occupies at the desired constant speed drives the primary transmission shaft, and continued displacement of the governor sleeve enables it to slide through the flange sleeve 21. The primary transmission shaft 24 may continue to be driven until the regulating member of the engine or machine has restored the speed approximately to the normal and caused the governor sleeve 11 to slide back to its original or normal position.

In the construction shown in Figure 2 in which the primary transmission shaft and reduction gearing remain unaltered, the friction pulley 36 is made of thin spring metal and is of cup-like form, the open side being directed towards the governor sleeve. In this construction the governor sleeve 37 is formed with two spaced external shoulders 38, 39 which are integral with the sleeve.

The peripheral edge of the spring friction pulley 36 may be turned backwardly as shown at 40 and is disposed so that it projects very slightly into the space between the two shoulders 38, 39 on the governor sleeve. The outer corners 41 of these shoulders are radiused and the arrangement is such that the two shoulders are adapted to engage the peripheral edge of the friction pulley at diametrically opposite points.

With this arrangement, when the governor sleeve moves axially, the radiused corner of one of its shoulders 38, 39, moves under and slightly displaces the periphery of the friction pulley 36 and drives it. Further movement of the governor sleeve 37 does not affect the drive as the periphery of the shoulder which is doing the driving can slide under the periphery of the friction pulley which is resilient.

When the governor has adjusted the speed back to the normal and the governor sleeve has moved back to its normal position, the friction drive is disengaged.

It will, of course, be understood, that if the governor sleeve is displaced axially in the direction opposite to that of its first displacement, then the second shoulder of the governor sleeve will come into operation and will drive the primary transmission shaft in a direction which is opposite to that in which it was first driven.

In both these arrangements the reduction gear enables the primary transmission shaft to operate at a substantial mechanical advantage, so that the governor sleeve is not unduly loaded during its operation.

In the construction shown in Figures 1 and 2, actuating mechanism takes the form of the lever 33 arranged transversely to the axis of the governor sleeve, one end of this lever having a direct connection to the muff associated with the governor sleeve, and the correcting mechanism operating upon the fulcrum 34 of the lever so as to adjust it bodily in a direction substantially parallel with the axis of the governor sleeve.

The end of the lever remote from the governor sleeve is connected by a link 42 or other means to the regulating member 43 of the engine or machine. This may be a throttle valve as shown.

In the arrangement shown in Figure 3, the actuating mechanism includes a hydraulic device consisting of a length of tube 44, with each end of which is associated either a flexible diaphragm or a collapsible container such as 45, the arrangement being such that movements of the governor sleeve are imparted directly or through a lever 46 to the diaphragm or container 45 at one end of the system and reproduced at the other end of the system and transmitted to the regulator of the engine or machine. In such an arrangement the correcting mechanism acts upon a third flexible diaphragm or collapsible container 9 which is in connection with the tube 44, so that an over-riding adjustment will be effected by the correcting mechanism. In such a case the correcting mechanism may operate on the diaphragm or container through the medium of a lever 47 mounted on a shaft 110 having a worm wheel 111 driven by the worm 48 on the secondary transmission shaft 29 receiving motion from reduction gear 27, 28 driven by the primary transmission shaft 24.

Figure 4:
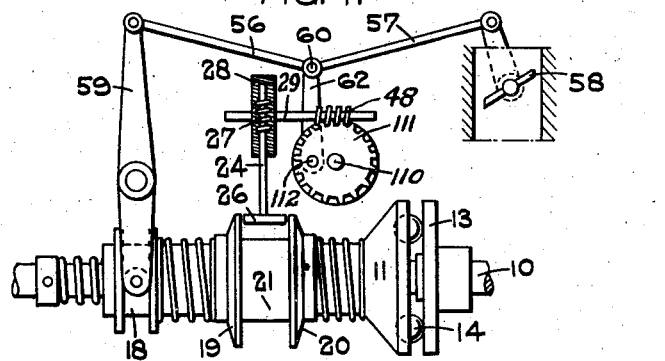
Figure 4 is a view in side elevation showing a further form of actuating mechanism.

In the arrangement shown in Figure 4, the effective length of a compound link 56, 57 connecting the regulating means 58 with a lever 59 connected directly to the governor sleeve is effected by pivoting the two links 56, 57 together at 60 with an obtuse angle between the two links. The correcting mechanism operates through a link 62 connected to the joint 60 and capable of altering the angle between the links 56, 57 in the manner of a toggle, so as to increase the effective length of the compound link 56, 57 as a whole. An increase in the effective length of the compound link 56, 57 applies a closing movement to the regulator valve 58. The link 62 has one end pivoted at 112 to the worm wheel 111 mounted on the shaft 110 and the worm wheel is operated by the worm 48 on the secondary transmission shaft 29. The shaft 29 is driven as in the constructions previously described through reduction gearing from the primary transmission shaft 24.

Figure 5:
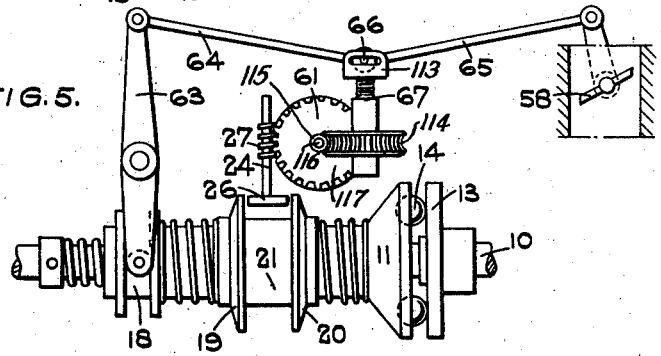
Figure 5 is a view in side elevation showing a further form of actuating mechanism.

In the arrangement shown in Figure 5, a lever 63 connected directly to the governor sleeve is connected at its opposite end to the regulating means of the engine or machine by means of a pair of links 64, 65, is pivoted together at 66 and normally arranged at an obtuse angle to each other, and the correcting mechanism includes a screw 67 engaging a slotted fork nub 113, the slots of which engage the ends of the pivot 66 and effecting an adjustment on the joint between the two links and tending to increase or decrease the angle between them. The screw 67 carries a worm wheel 114 driven by a worm 115 on a shaft 116 which in this case forms the secondary transmission shaft. This shaft 116 carries the worm wheel 117 which is driven by the worm gear on the primary transmission shaft 24.

Figure 6:
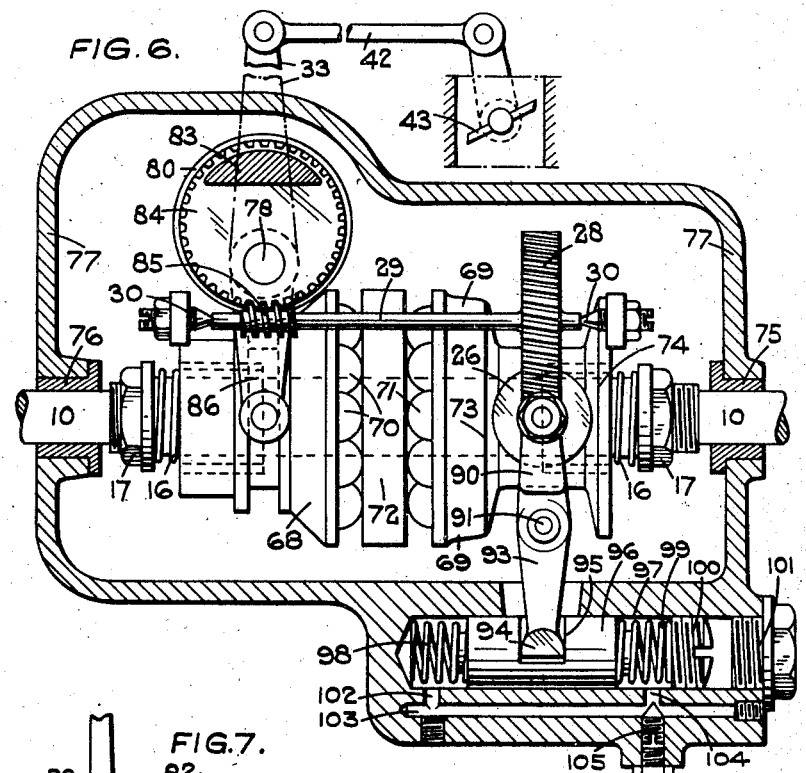
Figure 6 is a sectional view in side elevation showing a further construction in accordance with this invention.
Figure 7:
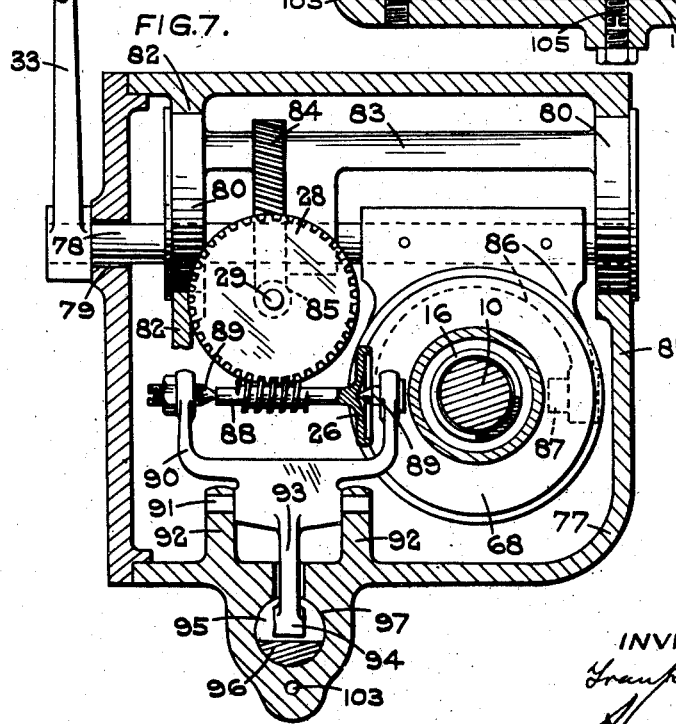
Figure 7 is a sectional end view of the construction shown in Figure 6.

In the construction shown in Figures 6 and 7, two governor sleeves, i. e., an actuator-connected sleeve 68 and a corrector-connected sleeve 69, are used, both driven by the governor shaft 10 and both adapted to receive endwise motion, one from a set of balls 70, and the other from a set of balls 71. Both sets of balls are carried in radial pockets formed on opposite sides of a disc 72 mounted on, and driven by, the governor shaft.

The governor sleeve 69 is provided with two shoulders 73 and 74 adapted to engage the friction disc of the primary transmission shaft at diametrically opposite points.

The governor shaft 10 is mounted in bearings 75, 76, in a casing 77. In this construction the actuating member is shown as a lever arm 33 mounted exterior to the casing 77 on a shaft 78. This shaft can move in an arcuate slot 79 in the casing, and it is mounted for oscillation in a pair of eccentrics 80, one of which is rotatably mounted in the casing side 81, and the other of which is mounted in a web 82 in the interior of the casing. The two eccentrics 80 are connected by an integral bar 83 which also carries a worm wheel 84 adapted to be driven by a worm 85 on the secondary transmission shaft 29.

The arm of the actuating lever which engages the muff associated with the governor member 68 is pinned to the shaft 78 and is shown at 86.

This arm is forked and provided with inwardly projecting trunnions, one of which can be seen at 87 in Figure 7.

The friction wheel 26 in this construction is mounted on a primary transmission shaft 88 carried in bearings 89 provided in the forked end 90 of a lever pivoted at 91 in a pair of lugs 92 provided on the casing. This lever is provided with a second arm 93 terminating in a head 94 engaging a slot 95 in a cylindrical slide 96. This slide 96 is mounted in a cylinder 97 formed or provided on the casing. Between one end of the slide 96 and one end of the cylinder is a spring 98, and bearing on the opposite end of the slide is a spring 99 which abuts against a screwed plug 100. The end of the cylinder is sealed by a plug 101. The arrangement is such that the plug 101 can be removed and the plug 100 can be adjusted so as to move the slide 96 in either direction, thus setting the neutral position of the lever 90, 93, and the friction wheel 26. By this means the constant speed at which the engine or machine will run can be adjusted manually.

The springs 98 and 99 oppose motion in either direction of the lever 90, 93, and tend to return the lever and the friction pulley to the neutral position.

Associated with the cylinder 97 and slide 96 is a dashpot device including the oil passages 102, 103 and 104. The flow of oil through these passages from the space at one end of the slide to the other can be controlled by a needle valve 105.

It will be appreciated that while the springs 98 and 99 tend always to return the friction wheel to the neutral position, the dashpot device opposes and damps any motion of the slide 96 either away from the position corresponding with the neutral position of the friction pulley or towards it.

This method of carrying the friction pulley and controlling its movements may be applied to any of the constructions described herein.

In order to return the engine or machine to the same constant speed as the original constant speed after a change of load, it is, as already explained, necessary for the correcting means to function so that a new position of the regulating member of the engine or machine will be obtained for a given position of the balls of the governor.

In order to bring the speed back to the initial constant as quickly as possible, it is necessary to over-correct, and this, if unchecked, would cause a speed fluctuation to the opposite side of the constant. The provision of the slide 96 and the springs acting thereon together with the damping device checks the over-correction as the speed is returning to the initial constant, the aforesaid mechanism operating to make the governor substantially deadbeat.

The said mechanism also has the advantage that the friction pulley being thus mounted resiliently, does not form a dead stop for the flanges on the governor sleeve, but engages the flanges with a resilient pressure.

With this arrangement, when a change of speed occurs, the lever 93 is moved into an inclined position by turning on its pivot 91. This movement is effected by one of the flanges 73 or 74 acting on the friction pulley 26.

When the speed is returning to the normal, a reversal of the direction of drive of the correcting mechanism takes place before normal speed has been restored owing to the inclination of the lever 93.

When the speed is returning towards normal after a displacement of the governor sleeve, one of the springs 98, 99 keeps the correcting drive in operation until the governor sleeve moves faster than the damped movement of the lever, so that the governor sleeve first stops the drive by one flange leaving the pulley, and then reverses the drive by bringing the other flange into contact with the opposite side of the pulley.

If no damping mechanism were provided, the correcting drive would continue to operate in the same direction until the governor sleeve had returned to the normal position, by which time there would be excessive correction necessitating movement of the governor sleeve to the other side of normal to unwind the excess correcting mechanism. Movement of the governor sleeve alternately on opposite sides of the normal position would then continue in an ever lessening amount. Damping eliminates this oscillation by bringing the unwinding of the correction into operation before reaching normal.

In the foregoing description three different forms of actuating mechanism are shown, i. e. the direct connection from the governor sleeve to the regulating means of the engine or machine, and two different constructions are shown for imparting the drive to the correcting mechanism. Further, in the construction shown in Figures 1 and 2, there is a single governor sleeve, while in the construction shown in Figures 6 and 7, there are two separate governor sleeves. I desire it to be understood that any of the forms of actuating mechanism disclosed may be used with any of the different means for driving the correcting mechanism, and further, any of the forms of actuating mechanism shown can be used either with a single governor sleeve or with two governor sleeves as disclosed in Figures 6 and 7.

What I claim then is:

1. Governing gear for engines or machines comprising a governor sleeve, driving means for the sleeve actuated by the engine or machine, centrifugal means for displacing said sleeve endwise during increases of speed of the engine or machine, loading means acting on said sleeve in opposition to said displacements, a regulator for the engine or machine, actuating means connecting said governor sleeve to said regulator, correcting means for said actuating means, and a coupling operating between the governor sleeve and said correcting means, said coupling being disengaged at the normal position of the governor sleeve and being engaged when the governor sleeve is displaced to either side of the normal position, said coupling operating to drive the correcting means in one direction when the governor sleeve is moving endwise in one direction and to drive the correcting means in the opposite direction when the governor sleeve is moving endwise in the opposite direction, said coupling engaging a resilient member so as to permit of further displacement of the governor sleeve after the coupling has been engaged, a second governor sleeve, the coupling comprising shoulders on the second governor sleeve, a primary transmission shaft forming part of the correcting mechanism and arranged transversely to the governor sleeves, and a friction pulley on said primary transmission shaft and disposed between said shoulders, the diameter of said pulley being less than the distance between said shoulders, said primary transmission shaft being mounted for movement substantially parallel to the axis of the governor sleeves.

2. Governing gear for engines or machines comprising a governor sleeve, driving means for the sleeve actuated by the engine or machine, centrifugal means for displacing said sleeve endwise during increases of speed of the engine or machine, loading means acting on said sleeve in opposition to said displacements, a regulator for the engine or machine, actuating means connecting said governor sleeve to said regulator, correcting means for said actuating means, and a coupling operating between the governor sleeve and said correcting means, said coupling being disengaged at the normal position of the governor sleeve and being engaged when the governor sleeve is displaced to either side of the normal position, said coupling operating to drive the correcting means in one direction when the governor sleeve is moving endwise in one direction and to drive the correcting means in the opposite direction when the governor sleeve is moving endwise in the opposite direction, said coupling including a resilient member so as to permit of further displacement of the governor sleeve after the coupling has been engaged, a second governor sleeve, said coupling comprising shoulders on the second governor sleeve, a lever pivoted on an axis transverse to the governor sleeves, said lever having a forked end carrying bearings, a primary transmission shaft forming part of the correcting mechanism and arranged transversely to the governor sleeves, said primary transmission shaft being mounted in said bearings, a friction pulley on said primary transmission shaft and disposed between said shoulders, the diameter of said pulley being less than the distance between said shoulders, and spring means opposing displacements of the lever in either direction away from the neutral position in which the friction pulley is midway between the shoulders.

3. Governing gear for engines or machines comprising a pair of governor sleeves, driving means for said sleeves actuated by the engine or machine, centrifugal means for displacing said sleeves endwise during increases of speed of the engine or machine, loading means acting on said sleeves in opposition to said displacements, a regulator for the engine or machine, actuating means connecting one of said governor sleeves to the regulator, correcting means for said actuating means, and a coupling operating between the other governor sleeve and said correcting means, said coupling being engaged when said one governor sleeve is displaced to either side of the normal position, said coupling operating to drive the correcting means in one direction when said one governor sleeve is moving endwise in one direction, and to drive the correcting means in the opposite direction when said one governor sleeve is moving endwise in the opposite direction, said coupling including a resilient member.

4. Governing gear according to claim 3, wherein the coupling comprises shoulders on the corrector-connected governor sleeve, a lever pivoted on an axis transverse to said corrector-connected governor sleeve, said lever having a forked end carrying bearings, a primary transmission shaft forming part of the correcting mechanism and arranged transversely to said corrector-connected governor sleeve, said primary transmission shaft being mounted in said bearings, a friction pulley on said primary transmission shaft and disposed between said shoulders, the diameter of said pulley being less than the distance between said shoulders, spring centralising means for the lever, and damping means operating on the lever and resisting movements thereof in both directions.

5. Governing gear according to claim 3, wherein the correcting means includes a primary transmission shaft forming part of the correcting mechanism and arranged transversely to the actuator-connected governor sleeve, a worm on said primary transmission shaft, a secondary transmission shaft arranged transversely to said primary transmission shaft, and a worm wheel on said secondary transmission shaft engaged by said worm, and wherein the coupling comprises shoulders on said corrector-connected governor sleeve, a lever pivoted on an axis transverse to said corrector-connected governor sleeve, said lever having a forked end carrying bearings, said primary transmission shaft being mounted in said bearings, a friction pulley on said primary transmission shaft and disposed between said shoulders, the diameter of said pulley being less than the distance between said shoulders, spring centralising means for the lever, and damping means operating on the lever and resisting movements thereof in both directions.

6. Governing gear according to claim 3, wherein the coupling comprises shoulders on the corrector-connected governor sleeve, a lever pivoted on an axis transverse to said corrector-connected governor sleeve, said lever having a forked end carrying bearings, a primary transmission shaft forming part of the correcting mechanism and arranged transversely to said corrector-connected governor sleeve, said primary transmission shaft being mounted in said bearings, a friction pulley on said primary transmission shaft and disposed between said shoulders, the diameter of said pulley being less than the distance between said shoulders, a cylinder for containing fluid, a slide fitting said cylinder, an arm on the lever mechanically engaging the slide, spring centralising means for said slide, said cylinder having a by-pass passage connecting its ends, and said slide constituting centralising and damping means for said lever.

7. Governing gear according to claim 3, wherein the coupling comprises shoulders on the corrector-connected governor sleeve, a lever pivoted on an axis transverse to said corrector-connected governor sleeve, said lever having a forked end carrying bearings, a primary transmission shaft forming part of the correcting mechanism and arranged transversely to said corrector-connected governor sleeve, said primary transmission shaft being mounted in said bearings, a friction pulley on said primary transmission shaft and disposed between said shoulders, the diameter of said pulley being less than the distance between said shoulders, a cylinder for containing fluid, a slide fitting said cylinder, an arm on the lever mechanically engaging the slide, a spring in one end of the cylinder and acting on the adjacent end of the slide, a spring in the other end of the cylinder and acting on the other end of the slide, means for adjusting the compression of said last-named spring, said cylinder having a by-pass passage connecting its ends, and a valve in said by-pass passage, said slide constituting centralising and damping means for said lever.

8. Governing gear according to claim 3, comprising a casing, a shaft extending through said casing and adapted to be driven by the engine or machine, the governor sleeves being mounted on said shaft and being driven thereby, the actuating means comprising an eccentric disc mounted in said casing on an axis which is transverse to the governor sleeves, an actuating shaft fixed eccentrically in said disc, the end of the casing having a slot through which said shaft protrudes, an actuating lever on the part of said shaft which is exterior to the casing, a mechanical connection between said lever and the regulator, and a lever arm within the casing and fixed on said actuating shaft, said arm being connected to one of said governor sleeves.

9. Governing gear according to claim 3, comprising a casing, a shaft extending through said casing and adapted to be driven by the engine or machine, the governor sleeves being mounted on said shaft and being driven thereby, and wherein the coupling comprises shoulders on the corrector-connected governor sleeve, a lever pivoted on an axis transverse to said corrector-connected sleeve, said lever having a forked end carrying bearings, a primary transmission shaft forming part of the correcting mechanism and arranged transversely to said corrector-connected sleeve, said primary transmission shaft being mounted in said bearings, a friction pulley on said primary transmission shaft and disposed between said shoulders, the diameter of said pulley being less than the distance between said shoulders, a cylinder for containing fluid, said cylinder being formed in the casing, a slide fitting said cylinder, an arm on the lever mechanically engaging the slide, spring centralising means for said slide, said cylinder having a by-pass passage connecting its ends, said by-pass passage being formed in the casing, and said slide constituting centralising and damping means for said lever.

10. Governing gear according to claim 3, comprising a casing, a shaft extending through said casing and adapted to be driven by the engine or machine, the governor sleeves being mounted on said shaft and being driven thereby, a web in the casing, the actuating means comprising a pair of spaced eccentric discs, one journalled in said web, and the other journalled in an end wall of the casing, a bar connecting said discs, an actuating shaft fixed eccentrically in said discs, the end of the casing having a slot through which said shaft protrudes, an actuating lever on the part of said shaft which is exterior to the casing, a mechanical connection between said lever and the regulator, and a lever arm within the casing and fixed on said actuating shaft, said arm being connected to one of said governor sleeves.

11. Governing gear for engines or machines, comprising a casing, a shaft extending through said casing and adapted to be driven by the engine or machine, a pair of governor sleeves on said shaft and driven thereby, a web in the casing, a pair of spaced eccentric discs, one journalled in said web and the other journalled in an end wall of the casing, a bar connecting said discs, a worm wheel carried by said bar and arranged concentrically with said discs, an actuating shaft fixed eccentrically in said discs, the end of the casing having a slot through which said shaft protrudes, an actuating lever on the part of said shaft which is exterior to the casing, said lever being adapted for connection to an engine or machine regulator, a lever arm within the casing and fixed on said actuating shaft, said arm being connected to one of said governor sleeves, a pair of spaced shoulders on the other governor sleeve, lugs in the casing, a lever pivoted to said lugs, said second mentioned lever having a forked end carrying bearings, a primary transmission shaft mounted on said bearings, said primary transmission shaft being disposed at right angles to the governor sleeves, a friction pulley on said primary transmission shaft and disposed between said shoulders, the diameter of said pulley being less than the distance between said shoulders, a worm on said primary transmission shaft, thrust bearings in said casing, a secondary transmission shaft mounted in said bearings, said secondary transmission shaft being disposed parallel to the governor sleeves, a worm wheel on said secondary transmission shaft gearing with said worm, a worm on said secondary transmission shaft, gearing with the worm wheel carried by said bar, said second mentioned lever having a second arm, a cylinder associated with said casing, a slide fitting said cylinder, said second arm engaging said slide, spring centralising means for said slide, said cylinder having a by-pass passage connecting its ends, and said slide constituting centralising and damping means for said lever.

12. Governing gear according to claim 11, including an adjustable screw plug in one end of the cylinder, a compression spring acting between said plug and one end of the slide, and a compression spring acting between the opposite end of the slide and the opposite end of the cylinder.

13. Governing gear according to claim 11, wherein the base of the casing has a slot which is parallel to the governor sleeves, a pair of lugs one on either side of said slot, said second mentioned lever being pivoted to said lugs, said cylinder being formed in the casing and disposed directly beneath said slot, said slide having a transverse slot in its upper side, and said second arm extending through said casing slot into the slot in the slide.

F. J. TIPPEN.